United States Patent [19]

Nogami et al.

[11] 4,180,652
[45] Dec. 25, 1979

[54] POLYESTER TYPE POWDER COATING COMPOSITION

[75] Inventors: Sumitaka Nogami, Fujisawa; Yoshio Matsumoto, Nobeoka; Keiichi Waki, Nobeoka; Tooru Okada, Nobeoka, all of Japan

[73] Assignee: Asahi Kasei Kogyo Kabushiki Kaisha, Osaka, Japan

[21] Appl. No.: 878,445

[22] Filed: Feb. 16, 1978

[30] Foreign Application Priority Data

Feb. 24, 1977 [JP] Japan .................................. 52/18656
Oct. 7, 1977 [JP] Japan .................................. 52/120124

[51] Int. Cl.$^2$ .................................... C08G 63/76
[52] U.S. Cl. .................... 525/437; 260/40 R; 260/40 P; 525/474; 528/176; 525/434; 528/190; 528/192; 528/194; 528/296; 528/298; 528/299; 528/304; 528/280
[58] Field of Search ............... 528/176, 177, 190, 192, 528/194, 273, 296, 298, 304, 485, 490, 11; 260/40 R, 40 P

[56] References Cited

U.S. PATENT DOCUMENTS

| | | | |
|---|---|---|---|
| 3,337,498 | 8/1967 | Hogsed et al. | 528/298 |
| 3,340,327 | 9/1967 | Spellberg et al. | 528/298 |
| 3,361,716 | 1/1968 | Parham | 528/298 |
| 3,448,072 | 6/1969 | Ashby | 260/40 R |
| 3,590,086 | 6/1971 | Gourse | 528/298 |
| 3,933,757 | 1/1976 | Pratt et al. | 528/298 |
| 4,066,606 | 1/1978 | Vargiu et al. | 528/273 |

*Primary Examiner*—Lucille M. Phynes
*Attorney, Agent, or Firm*—Armstrong, Nikaido, Marmelstein & Kubovcik

[57] ABSTRACT

A novel polyester type powder coating composition which includes a specific self-hardening polyester of air-hardening type comprising as main ester-constituting monomer units, (1) at least one polycarboxylic acid component containing at least 10 mole %, based on the polycarboxylic acid component, of at least one aromatic polycarboxylic acid component (A) and (2) at least one polyhydric alcohol component, having in its main chain at least one terminal blocked with a monofunctional unsaturated alicyclic compound component (B) and having a softening point of 30° to 150° C. This composition is excellent in storage stability and adaptability to either thin coating or thick coating, and when it is applied onto an article to be coated and baked at a temperature of 170° to 230° C. for 5 to 30 minutes, a coating excellent in appearance, mechanical strength, gloss and reflection sharpness can be formed advantageously without generating undesired gases at the baking.

9 Claims, No Drawings

POLYESTER TYPE POWDER COATING COMPOSITION

The present invention relates to a novel composition for powder coating. More particularly, the present invention provides a powder coating composition which includes a self-hardening polyester of air-hardening type which can easily be hardened by heating in air and which is excellent in storage stability and adaptability to either thin coating or thick coating.

Various powder coating compositions have been developed with a view to meeting industrial and economical requirements such as prevention of environmental pollution, saving of resources and saving of energies. Among them, epoxy type, acrylic type and polyester type thermo-hardening powder coating compositions are broadly used because they provide coatings excellent in mechanical properties. However, epoxy type powder coating compositions are poor in weatherability, though they provide coatings excellent in corrosion resistance, and acrylic type powder coating compositions are poor in corrosion resistance though they provide coatings excellent in weatherability. Polyester type powder coating compositions can generally provide coatings having a well-balanced combination of weatherability and corrosion resistance, and therefore, they attract attention in the art recently.

Various attempts have been made to develop polyester type powder coating compositions in which the above-mentioned characteristics are fully utilized, but none of these conventional polyester type coating compositions are satisfactory.

For example, a polyester type powder coating composition comprising a blocked isocyanate as a hardener (see Japanese Patent Publication No. 2179/74) has excellent coating characteristics but the coating composition of this type has some defects. More specifically, (1) the hardener used is expensive and (2) since a large quantity of a harmful gas is generated from a blocking agent contained in the hardener at the baking step, the intended prevention of environmental pollution cannot be attained and an expensive equipment must be provided for treatment of this harmful gas. Moreover, (3) when a thick coating having a thickness larger than 100μ is formed by one coating operation, the blocking agent is evaporated at the baking step and it is impossible to form a coating free of unfavorable foams. Accordingly, coating operation should be repeated at least two times to attain the desired thickness, and most characteristic advantage of a powder paint that thick coatings can be obtained by one coating operation cannot be enjoyed.

Also a polyester type powder coating composition including a low molecular weight epoxy compound or an epoxy resin as a hardener is known (see Japanese Patent Application Laid-Open Specifications Nos. 17583/72, 24244/74 and 44100/74). Most of low molecular weight compounds used are volatile compounds harmful to the human body, and special equipments should be disposed for safety at the paint manufacturing step and coating step. Further, because of low melting points of these epoxy compounds, caking is readily caused in powder paint during storage. This is a fatal defect of powder coating compositions. When a polymeric epoxy resin which is less harmful to the human body than the aforementioned epoxy compounds is used, the epoxy resin must be incorporated in a large quantity so as to attain an equivalent relation of cross-linking functional groups between the epoxy resin and polyester resin, and as a result, good weatherability inherent of polyester type powder paints is lost.

A polyester type powder coating composition including a peroxide as a hardening catalyst instead of the abovementioned defective hardener is known (see Japanese Patent Application Laid-Open Specifications Nos. 93422/74 and 30471/74). A coating composition of this type is advantageous in that an expensive hardener is not used, a harmful gaseous component is not generated and a thick coating excellent in mechanical properties can be obtained. However, since the hardening reaction is a radical reaction using a peroxide as an initiator, the hardening reaction is often inhibited by oxygen in air. In order to avoid this disadvantage, radicals must be generated in quantities exceeding the amount of oxygen dissolved in the molten coating. Namely, it is necessary to incorporate in a polyester a large quantity of a peroxide capable of decomposing at a high velocity at the baking step. In this case, however, no good balance can be attained between the melt flowability and the hardening reactivity, and therefore, polyester powder coating compositions including a peroxide as the hardening catalyst fail to provide coatings having a good appearance excellent in decorative effect. Also in case of coating compositions of this type, hardening is inhibited in the surface layer of coating which is liable to have contact with air and the surface hardening is insufficient. Further, when powder paints of this type are stored for a long time, the peroxide is slightly decomposed to advance the hardening reaction and cause problems in practical application.

There are also known further polyester type powder coating compositions, which are excellent over the above-mentioned various polyester type powder coating compositions in effect of prevention of environmental pollution, manufacturing cost, decorative effect of coatings and storage stability of paints. More specifically, a self-hardening polyester powder coating composition of air-hardening type comprising as a hardener a polyester having a tricyclodecene ring instead of a volatile vinyl monomer is disclosed by Japanese Patent Application Laid-Open Specification No. 115538/76. A polyester type powder coating composition which does not include a hardener or a hardening catalyst and is hardened by heating in air is disclosed by Japanese Patent Application Laid-Open Specification No. 6637/75, wherein the self-hardening polyester powder coating composition of air hardening type comprises a polyester including, as a dicarboxylic acid component, an air-hardening component such as endomethylenetetrahydrophthalic acid.

Polyester paints comprising an air-hardening component have been investigated also in the field of solvent type paints. It is known that in case of paints of this type, the surface layer of the coating in contact with air is readily hardened but the inner portion of the coating that is hardly allowed to have contact with air is not sufficiently hardened. Accordingly, a polyester having an air-hardening component is incorporated in a solvent type polyester paint mainly for improving the surface hardening property in a coating of a polyester paint comprising a peroxide as the hardening catalyst. Of course, many solvent type paints including an air-hardening component-containing polyester alone are known, but when these paints are used for thick coating (about 100–250μ), there cannot be obtained coatings having good physical properties because the hardening property is poor at the inner portion of the coatings. In case of solvent type paints, this defect is not so serious, because solvent type paints are generally used for formation of thin coatings (about 20–100μ).

On the other hand, in case of powder paints, there is expected to form thick coatings by one coating operation to save energy and enhance the coating operation efficiency. In other words, it is one of the most characteristic advantages of powder paints that a thick coating can be readily formed.

However, the aforementioned self-hardening polyester powder coating compositions of the air-hardening type are still insufficient in property for forming a thick coating as in the above-mentioned solvent type paints, though they have various advantageous characteristics as mentioned above. In short, they are fatally defective as powder paints in that when a thick coating is formed, contraction is caused on the surface of the coating because of the difference of the hardening speed between the surface layer and inner portion of the coating and a thick coating having good mechanical properties cannot be obtained. On the other hand, it is expected that powder paints are also applied to formation of thin decorative coatings. In order to make this application possible, it is required that powder paints should have such a high hiding ability that the surface of a substrate to be coated can be sufficiently hidden and concealed even by a thin coating. This will be attained by incorporating a large quantity of a pigment in a powder coating composition. In general, powder paints are inferior to solvent type paints with respect to pigment-dispersing property. In addition it is noted that, in case of the above-mentioned self-hardening polyester powder coating compositions of the air-hardening type which compositions contain a pigment in a high concentration, deteriorations of the coating appearance and mechanical properties are more conspicuous when they are applied to formation of thin coatings.

The inventors of the present invention made extensive and intensive investigations with a view to developing a powder coating composition including a polyester containing an air-hardening component, which has improved adaptability to formation of either thick coatings or thin coatings, and it was found that when a specific polyester is used preferably without incorporation of a hardening agent or hardening catalyst, a polyester powder coating composition excellent in the adaptability to formation of either thick coatings or thin coatings can be obtained. We have now completed the present invention based on this finding.

More specifically, in accordance with the present invention, there is provided a polyester type powder coating composition comprising a polyester comprising as main ester-constituting monomer units, (1) at least one polycarboxylic acid component containing at least 10 mole %, based on the polycarboxylic acid component, of at least one aromatic polycarboxylic acid component (A) and (2) at least one polyhydric alcohol component, and said polyester having in its main chain at least one terminal blocked with a monofunctional unsaturated alicyclic compound component (B) and having a softening point of 30° to 150° C.

The powder coating composition of the present invention shows an excellent self-hardening property under heating in air without generation of volatile by-products. Accordingly, environmental pollution is not substantially caused by exhaust gases from a baking and drying furnace. Further, the resulting coating has an appearance excellent in gloss and reflection sharpness.

In addition to the aforementioned excellent self-hardening property, the composition of the present invention has various advantages over the conventional self hardening polyester powder coating compositions of the air-hardening type. For example, even in case of thick coatings, occurrence of defects due to the contracting phenomenon is remarkably eliminated, and to our great surprise, various mechanical properties are prominently improved.

Furthermore, even when a pigment is incorporated at a high concentration for formation of a thin coating, the composition of the present invention provides a coating having very good appearance and physical properties, and the appearance is comparable to that of a coating formed from a solvent type paint.

These characteristic advantages of the present invention are quite surprising and cannot be expected from the conventional powder coating compositions at all.

The characteristics and effects of the powder coating composition of the present invention are owing to the specific polyester used in the present invention having, in its main chain, at least one terminal blocked with a monofunctional unsaturated alicyclic compound component. The polyester of the present invention includes a monofunctional unsaturated alicyclic compound component which readily shows cross-linking reactivity by heating in air when incorporated into the polyester, and since this specific component is present in the main chain of the polyester at at least one terminal, the resulting cross-linkages have a structure wherein the terminals of the polyesters are linearly connected with each other and/or a structure wherein the terminal of the polyester are connected with the unsaturated bond in the chain of other polyester and give very good properties to the formed coating. Moreover, since this monofunctional unsaturated alicyclic compound component blocking at least one terminal in the main chain of the polyester has a very good plasticity, the polyester shows a good melt flowability under heating and hence, it provides a coating excellent in appearance.

These characteristics and effects of the powder coating composition are manifested due to an unexpected synergistic action of the specific cross-linking reactivity and melt flowability of the polyester used in the present invention. In view of the fact that the composition of the present invention provides thick coatings having good properties and a pigment can be incorporated at a high concentration, it will readily be understood that the composition of the present invention is an epoch-making self-hardening polyester powder coating composition of air-hardening type.

The composition of the present invention having the aforementioned characteristics and effects has good adaptability to thick coating mainly for protection of metallic construction materials, traffic-control signs, agricultural machines and equipments and the like, of which future development is expected, and also to thin coating mainly for decoration of household electric appliances, metallic furniture, automobiles and the like. Accordingly, the composition of the present invention is very valuable from the industrial viewpoint.

As described, the essential feature of a powder coating composition according to the present invention consists in that there is used a polyester comprising as main ester-constituting monomer units, (1) at least one polycarboxylic acid component containing at least 10 mole %, based on the polycarboxylic acid component, of at least one aromatic polycarboxylic acid component (A) and (2) at least one polyhydric alcohol component and having in its main chain at least one terminal blocked with a monofunctional unsaturated alicyclic compound component (B).

In the polyester as mentioned above, the main ester-constituting monomer units may be present in an amount of 60 to 100 mole %, preferably 80 to 100 mole %, based on the total ester-constituting monomer units of the polyester.

The polycarboxylic acid component including the aromatic polycarboxylic acid component may preferably have 2 to 4 carboxyl groups, more preferably 2 (two) carboxyl groups.

As acids for introducing into the polyester the aromatic polycarboxylic acid component (A) there can be mentioned, for example, terephthalic acid, isophthalic acid, phthalic anhydride, 1,5-naphthalene-dicarboxylic acid, 1,6-naphthalene-dicarboxylic acid, p,p'-diphenyl-carboxylic acid, p,p'-methylene-dibenzoic acid, p,p'-ethylene-dibenzoic acid, bis-(p,p'-dicarboxyphenoxy) ethane, trimellitic acid and pyromellitic acid. These aromatic polycarboxylic acids may be employed alone or in mixture. In the present invention, in order to attain good storage stability in the powder paint and good weatherability in the resulting coating, it is important that the aromatic polycarboxylic acid components (A) should be used in an amount of at least 10 mole % based on the total polycarboxylic acid components. The amount of the aromatic polycarboxylic acid components (A) may be 100 mole %, but preferably in the range of from 30 to 80 mole % based on the total polycarboxylic acid component.

As acids for introducing into the polyester other polycarboxylic acid components than the aromatic polycarboxylic acid component, there can be mentioned, for example, acids corresponding to α,β-unsaturated dicarboxylic acid acid; aliphatic carboxylic acids such as succinic acid, adipic acid, azelaic acid, sebacic acid and dodecane-dicarboxylic acid; tetrahydrophthalic acid; endo-methylene-tetrahydrophthalic acid; 4-methyl-endomethylene-tetrahydrophthalic acid; and dicyclopentadiene-polycarboxylic acids obtained by addition reaction of equimolar amounts of a polycarboxylic acid having at least 3 carboxyl groups and dicyclopentadiene. Also anhydrides and ester-forming derivatives of these polycarboxylic acids may be used in the present invention. These acids may be employed alone or in mixture.

As a compound for introducing into the polyester the monofunctional unsaturated alicyclic compound component (B), there can be used at least one member selected from compounds containing a cyclohexene ring, a norbornene ring, a tricyclodecene ring or a derivative thereof substituted with an alkyl group having 1 to 3 carbon atoms or halogen. Preferred examples of the halogen used as the substituent of the above-mentioned ring moieties include, for example, chlorine, fluorine and bromine.

Preferred examples of such compounds for introducing into the polyester the monofunctional unsaturated alicyclic compound component (B) are represented by the following general formula:

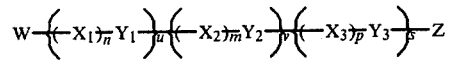

wherein W stands for a monovalent residue selected from

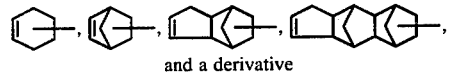

and a derivative and a derivative
thereof substituted with an alkyl group having 1 to 3 carbon atoms or a halogen; $X_1$, $X_2$ and $X_3$ each stand for a divalent residue selected from

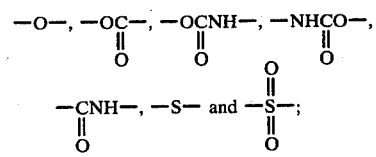

$Y_1$, $Y_2$ and $Y_3$ each stand for a straight-chain or branched alkylene group having 1 to 10 carbon atoms or a phenylene group; Z stands for a hydroxyl group or a carboxyl group; n, m and p each stand for 0 or 1; u, v and s each stand for an integer of from 0 to 5; and the total of u, v and s is not more than 5. Preferred examples of the halogen used as the substituent of the above-mentioned ring moieties include, for example, chlorine, fluorine and bromine.

Specific examples of the compounds represented by the aforementioned general formulae are as follows:

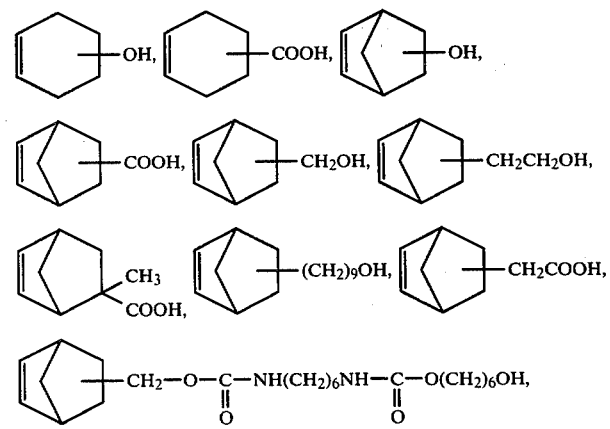

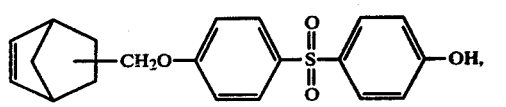
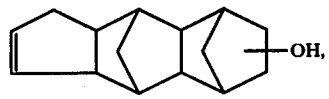
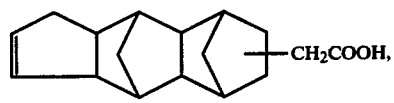
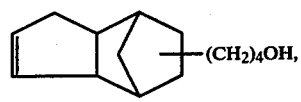
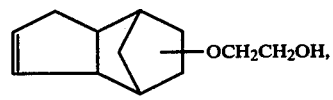
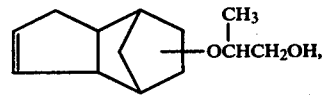
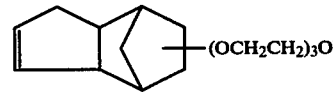
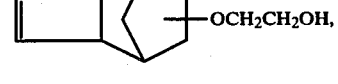
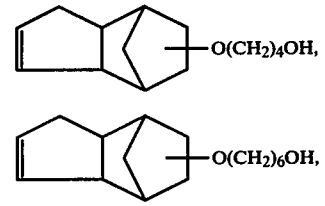

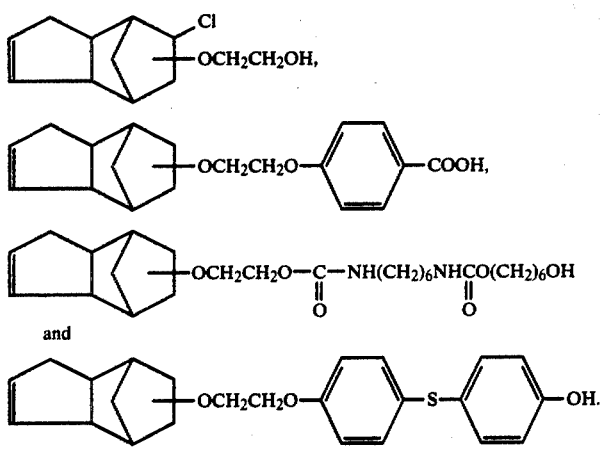

and

Among the above-mentioned monofunctional unsaturated alicyclic compounds, a compound having a tricyclodecene ring is preferably employed. As typical examples thereof, there can be mentioned monohydric alcohols represented by the following formula and/or its derivative wherein at least one hydrogen atom of its tricyclodecene ring is substituted with an alkyl group having 1 to 3 carbon atoms or halogen:

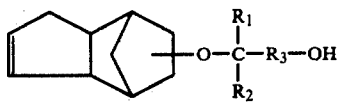

wherein $R_1$ and $R_2$ each stand for a hydrogen atom or an alkyl group having 1 to 3 carbon atoms and $R_3$ stands for a straight-chain or branched alkylene group having 1 to 10 carbon atoms or a divalent residue having at least one member selected from an ether linkage, an ester linkage, an urethane linkage, amide linkage, thioether linkage and sulfone linkage, and a straight-chain or branched alkylene group having 1 to 10 carbon atoms and/or phenylene group, and the total of the carbon atoms of $R_1$, $R_2$ and $R_3$ is 1 to 19. Representative examples of the above-mentioned straight-chain or branched alkylene group having 1 to 10 carbon atoms are $-CH_2-$, $-(CH_2)_2-$, $-\overset{CH_3}{\underset{|}{CH}}-$, $-(CH_2)_3-$, $-CH_2-\overset{CH_3}{\underset{|}{CH}}-$, $-(CH_2)_4-$, $-(CH_2)_5-$, $-(CH_2)_6-$, $-(CH_2)_7-$, $-(CH_2)_8-$, $-(CH_2)_9-$ and $-(CH_2)_{10}-$, preferably, $-CH_2-$, $-(CH_2)_2-$, $-\overset{CH_3}{\underset{|}{CH}}-$, $-(CH_2)_3-$, $-CH_2-\overset{CH_3}{\underset{|}{CH}}-$, — and and $-(CH_2)_5-$.

Preferred examples of the halogen used as the substituent of the above-mentioned ring moiety include, for example, chlorine, fluorine and bromine.

Further, among the monofunctional unsaturated alicyclic compounds, there can be more preferably employed, to enhance the characteristics and effects of the present invention in thick coating and thin coating, a monohydric alcohol represented by the following formula and/or its derivative wherein the hydrogen atom of its tricyclodecene ring is substituted with an alkyl group having 1 to 3 carbon atoms or halogen:

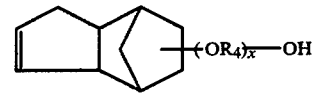

wherein $R_4$ stands for a straight-chain or branched alkylene group having 2 to 10 carbon atoms, x stands for an integer of from 1 to 5, and the total of the carbon atoms contained in $-(OR_4)_x-$ is 2 to 20.

Preferred examples of the halogen used as the substituent of the above-mentioned ring moiety include, for example, chlorine, fluorine and bromine.

In the foregoing general formula, representative examples of the alkylene group having 1 to 10 carbon atoms as defined as $R_4$ are $-(CH_2)_2-$, $-\overset{CH_3}{\underset{|}{CH}}-$, $-(CH_2)_3-$, $-CH_2-\overset{CH_3}{\underset{|}{CH}}-$,
$-(CH_2)_4-$, $-(CH_2)_5-$, $-(CH_2)_6-$, $-(CH_2)_7-$, $-(CH_2)_8-$,
$-(CH_2)_9-$ and $-(CH_2)_{10}-$, preferably, $-CH_2-$,
$-(CH_2)_2-$, $-\overset{CH_3}{\underset{|}{CH}}-$, $-(CH_2)_3-$, $\overset{CH_3}{\underset{|}{CH}}-$, $(CH_2)_4-$
and $-(CH_2)_5-$.

As especially preferred examples, there can be mentioned the following compounds:

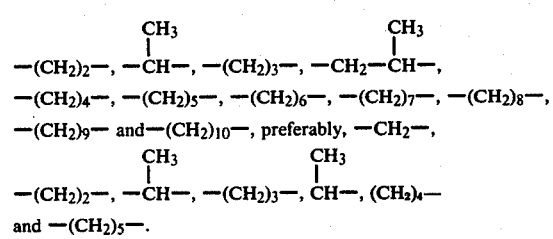

Such monofunctional unsaturated alicyclic compound may be introduced into the terminals of the polyester by reacting this compound with other polycarboxylic acids and polyhydric alcohols in the preparation of the polyester.

Of polyhydric alcohols, there may preferably be employed dihydric alcohols, trihydric alcohols and tetrahydric alcohols. Dihydric alcohols are most preferably employed. Preferred examples of the polyhydric alcohols include, for example, ethylene glycol, propylene glycol, neopentyl glycol, 1,4-cyclohexane diol, 1,4-butane diol, 1,4-cyclohexane dimethanol, hydrogenated bisphenol A, propylene glycol-added bisphenol A, ethylene glycol-added bisphenol A, glycerin, trimethylol propane, pentaerythritol, dihydroxynorbornene, and dicyclopentadiene-polyhydric alcohols formed by addition reaction of equimolar amounts of a polyhydric alcohol having at least 3 alcoholic hydroxyl groups and dicyclopentadiene.

A modifier of polyester such as hydroxy-carboxylic acids, for example, hydroxybenzoic acid, hydroxylated norbornene-carboxylic acid and hydroxylated stearic acid may be used in the present invention according to need.

Further, when polyesters of the present invention are prepared, they may be modified by adding and reacting amine compounds, amide compounds, epoxy compounds, vinyl compounds, isocyanate compounds or silicone compounds, or monohydric alcohols or monocarboxylic acids other than the aforementioned compounds for introducing into the polyester the monofunctional unsaturated alicyclic compound components (B) of the present invention according to need, so far as the intended characteristics of the present invention are not lost. Further, such linkages as amide, urethane, ether, silicone and sulfone may be incorporated into polyester chains.

In addition to the various advantageous characteristics of the polyester type powder coating composition according to the present invention, it is desired to have sufficient paint performances when it is applied to coating of outdoor building materials which is one of the most important use of polyester type powder coating compositions. In such application, thick coating is generally formed and black paints are usually used. In this connection, it is to be noted that conventional polyester type powder coating compositions including no low molecular weight hardener which has a plasticizing effect when heated, especially, conventional self-hardening polyester powder coating compositions of air-hardening type, are inferior in thermal melt flowability of the paints and affinity to the paints so that they cannot form coatings of uniform thickness when used to coat articles of complicated shape or configuration by fluidization dip coating which is a typical method for thick coatings. Further, they have fatal defects that they are extremely poor in property of dispersing carbon black which is usually employed for black paints and generally very poor in affinity to resins and dispersibility in paints and that they can hardly be used for black paints.

In contrast, the polyester to be employed in the present invention, especially such a polyester comprising, as main ester-constituting monomer units, (1) polycarboxylic acid components including aromatic polycarboxylic acid components (A) and $\alpha,\beta$-unsaturated dicarboxylic acid components (C) and (2) polyhydric alcohol components having in its main chain at least one terminal blocked with a monofunctional unsaturated alicyclic compound component (B), in which the (A)/(B) molar ratio is from 1 to 85, especially from 5 to 60, the (C)/(B) molar ratio is from 0.5 to 70, especially from 2 to 50, and the difference $(T_2 - T_1)$ between the softening point $(T_1, °C.)$ of the polyester and the temperature $(T_2, °C.)$ at which the polyester has a melt viscosity of 2000 poises is 30° to 120° C., especially 40° to 90° C., can advantageously provide good applicability to thick coating by fluidization dip coating and excellent property of dispersing carbon black, thus increasing the industrial importance of the present invention.

In this preferred polyester, if one of the aromatic polycarboxylic acid components (A) is a terephthalic acid component and one of the $\alpha,\beta$-unsaturated dicarboxylic acid components is a fumaric acid component, the adaptability to fluidization dip coating and the carbon black-dispersing property can be improved especially remarkably and also the adaptability to either the thick coating or the thin coating can be improved conspicuously.

The polyester that is used in the present invention may be prepared, in principle, according to known polyester-forming methods, especially the reduced pressure polycondensation method. The typical method for preparing polyesters are disclosed for example by "Modern Industrial Chemistry", Asakura Shoten, Tokyo, Vol. 17, pp 85–91, 1966. In preparing the polyester to be used in the present invention, the molar ratio of the polycarboxylic acid to be charged to the polyhydric alcohol to be charged may be determined arbitrarily. When the polyester is formed, the molar ratio of the acid component to the alcohol component is varied depending on the valency of the raw materials employed, but in general, the molar ratio may preferably be 1 (one).

The softening point of a polyester obtained by polycondensing the aforementioned acid and alcohol components should be 30° to 150° C. If the softening point of the polyester is lower than 30° C., the resulting powder paint is poor in the blocking resistance, and if the softening point of the polyester is higher than 150° C., the appearance of the resulting coating is not good.

From the viewpoints of the storage stability and coating appearance, it is preferred that the number average molecular weight (hereinafter referred to as molecular weight) of the polyester of the present invention be 500 to 20,000, especially 3,000 to 14,000.

Iron values, silicon compounds, flow modifiers and pigments may be incorporated as additives in the present composition. It is advantageous to incorporate the iron values in the composition because the corrosion resistance can be remarkably improved by incorporation of the iron values. Further, when the iron values are present in combination with a silicon compound, the corrosion resistance and hardening property can be improved prominently. Flow modifiers and pigments are incorporated for attaining the objects customarily attained in the art by incorporation of these additives. The foregoing additives are appropriately chosen and combined according to the intended object and use of the powder coating composition. In the present invention, the composition is generally composed of the polyester of the present invention, a flow modifier and a pigment. It is preferred to additionally incorporate the iron values in the composition. It is further preferred to incorporate the iron values together with a silicon compound.

When the iron values substantially dissolved in the polyester of the present invention are present in an amount of 0.00001 to 0.1 part by weight, preferably 0.00005 to 0.01 part by weight, especially preferably 0.0001 to 0.005 part by weight, as calculated as the iron atom per 100 parts by weight of the polyester, the corrosion resistance can be improved especially prominently. When the amount of the dissolved iron values is less than 0.00001 part by weight per 100 parts by weight of the polyester, no substantial improvement of the corrosion resistance can be attained, and when the amount of the dissolved iron values is larger than 0.1 part by weight, the weatherability and appearance of the resulting coating are degraded.

In the composition of the present invention containing iron values substantially dissolved in the polyester, it is construed that the above-mentioned effects of the present invention can be prominently manifested by coordination bonds formed between iron atoms which are present in the form of iron, iron ion and/or iron compound and functional groups in the polyester, such as double bonds, hydroxyl groups and carboxyl groups. If the iron values are homogeneously dispersed in the polyester while maintaining the uniform particle size, the effects of the present invention cannot be obtained.

As the method for incorporating iron values into the polyester of the present invention in the substantially dissolved state, there can be mentioned, for example, a method utilizing directly the solubility of iron compounds in the polyester, namely a method wherein the iron compound is incorporated in the molten polyester. For example, the iron compound may be added at the step where the polyester of the present invention alone or a mixture of the present polyester and additives is molten under heating by a kneader to substantially dissolve the iron values in the polyester. The temperature for melting the polyester or the mixture is higher than the melting point of the polyester to be employed and lower than the decomposition point of said polyester, and preferably in the range of 100° to 200° C. The melting time may be more than 1 minute and less than the gel time of the polyester, and preferably 5 to 20 minutes. It is preferred to effect the melting in the atmosphere of nitrogen. It is further recommended to add the iron compound after pulverized into particles of 70μ or less when the iron compound to be employed is solid.

Alternatively, there may be employed another method where the iron compound is preliminarily dissolved in the raw materials of the polyester to incorporate the iron values into the polyester in the substantially dissolved state. According to this method, for example, a slight amount of the iron compound is reacted with raw materials of the present polyester, namely the polycarxylic acid and/or polyhydric alcohol to first prepare pre-treated polycarboxylic acid and/or polyhydric alcohol in which said slight amount of iron compound is present as iron values, and then obtain the polyester of the present invention using such pre-treated polycarboxylic acid and/or polyhydric alcohol.

Further alternatively, the iron compounds may be added at the step of polycondensation, namely, reaction step such as step of ester interchange reaction, step of dehydration reaction or step of deglycolization reaction and heated at 150° to 250° C. for 2 to 15 hours to incorporate the iron values in the substantially dissolved state.

Among these methods, the third method in which the iron compound is added at the step of polycondensation for formation of the polyester is most preferred, because the effects of the present invention can be attained most prominently. Accordingly, it is preferred to add at least a part, especially all, of the iron compound at the polycondensation step.

In each of the foregoing three dissolving methods, when the iron compound is added, it is possible to enhance the solubility of iron compound by dissolving it in a solvent such as water or methanol. This solvent used for enhancing the solubility of the iron compound is substantially removed by various heating steps through which the polyester is formed into a final powder coating composition. Thus, a solid powder coating composition, namely a powder coating composition comprising a polyester containing iron values substantially dissolved therein, can be obtained.

As the iron compounds, there can be used at least one member selected from known iron compounds. In the present invention, organic compounds of iron such as ferrocene, iron carbonyl compounds and iron acetylacetonates, iron salts of organic acids such as lactic acid, 2-ethylhexanoic acid and naphthenic acid, and iron salts of inorganic acids such as nitric acid and hydrochloric acid are preferably employed, because these iron compounds are especially readily soluble in the polyester that is used in the present invention. These iron compounds may be employed alone or in mixture.

In addition to the above-mentioned iron values incorporated in the polyester by adding the iron compounds, iron values contained as an impurity in raw materials for the production of the polyester and iron values incorporated as an impurity in the polyester preparation process also are effective as the iron values of the present invention if they are substantially dissolved in the polyester.

As stated above, the polyester containing the iron values substantially dissolved therein according to the methods as mentioned above manifests the characteristics of the present invention, but when the iron compounds are simply pulverized and mixed with the polyester in dry state, the iron values are homogeneously dispersed in the polyester while maintaining the uniform particle size and the intended effects cannot be obtained. In order to get the iron values substantially dissolved in the polyester, the iron values are to be present in the substantially dissolved state in the form of molecules and/or atoms of iron.

In the present invention, in addition to the above-mentioned iron values, a silicon compound may be incorporated in an amount of 0.0001 to 1 part by weight, preferably 0.0005 to 0.1 part by weight, especially preferably 0.001 to 0.05 part by weight, as calculated as the silicon atom per 100 parts by weight of the polyester. In this case, a powder coating composition having much improved corrosion resistance and hardening property can be obtained. When the amount of the silicon compound is less than 0.0001 part by weight per 100 parts by weight of the polyester, no substantial effects can be attained by incorporation of the silicon compound. When the amount of the silicon compound is larger than 1 part by weight per 100 parts by weight of the polyester, the stain resistance is degraded in the resulting coating.

In general, known silicon compounds can be used in the present invention. It is preferred to employ a polysiloxane derivative such as dimethylpolysiloxane, methylphenylpolysiloxane, methylhydropolysiloxane or fluorinated polysiloxane, or a silanol derivative such as triphenylsilanol, tributylsilanol or trioctylsilanol, alone or in mixture.

The time for addition of the silicon compound may be determined according to such methods as described above with respect to the iron compound. In the present invention, it is especially preferred to add the silicon compound together with at least a part of the above-mentioned iron compound at the polycondensation step. However, it is to be noted that there is no critical conditions for such addition of silicon compound because the silicon compound generally has good compatibility with the polyester as compared with the iron compound and can be readily dissolved in the polyester.

As other additives that can be used in the present invention, there can be mentioned, for example, flow modifiers such as acrylic copolymers, silicone type copolymers, fluorine-containing polymers and waxes, inorganic pigments such as titanium oxide, red iron oxide, titan yellow, barium sulfate, calcium carbonate and zinc oxide, and organic pigments such as carbon black, phthalocyanine pigments, anthraquinone pigments and quinacridone pigments.

The foregoing additives are appropriately chosen and used according to the intended object and use and they are combined with the polyester of the present invention, and the resulting polyester composition is formed into a powder paint according to a known method for the production of powder paints, for example, a method as disclosed by "Journal of Paint Technology", Vol. 44, No. 570, July 1972, pp 52–55. In the composition of the present invention, cross-linking reaction hardly proceeds under conditions adopted for the production of a powder paint. Accordingly, powder paints which are stable in properties can be prepared advantageously in the present invention. The particle size of the resulting powder paints of the present invention is 10 to 300μ, preferably 20 to 150μ.

The effects and characteristics of the present invention can be attained most advantageously when 0.05 to 5.0 parts by weight of a flow modifier and 1 to 200 parts by weight of an inorganic pigment and/or 0.1 to 50 parts by weight of an organic pigment are incorporated in 100 parts by weight of the polyester.

In addition to the foregoing ingredients, the composition of the present invention may further comprise hardening agents such as blocked polyisocyanates, epoxy compounds and melamine derivatives, hardening catalysts or promotors such as peroxides, azobisnitriles, drying agents and tin compounds, and polymers such as vinyl chloride polymers, acrylic polymers, polyesters, polyamides and epoxy group-containing polymers according to necessity, so long as they do not spoil the effect of the present invention. In order to attain the characteristics of the present invention effectively, it is preferred that a hardening agent such as a blocked polyisocyanate or epoxy compound or a hardening catalyst such as a peroxide or azobisnitrile be not added.

The powder coating composition can be coated according to known coating methods, for example, a method as described in "Handbook of Powder Coating Practice", Gijutsu Shoin, Tokyo, pp 9–14, 1974. The coated composition can be sufficiently baked by heating it at 170° to 230° C. for 5 to 30 minutes. More specifically, according to powder spreading method, an article to be coated is preheated to 160° to 260° C. and the powder paint is spread using an air-spray gun prior to the baking. According to fluidization dip coating method, an article to be coated is also preheated to 160° to 260° C. and dipped in a fluidized powder bed before the baking. According to electrostatic spray coating method, an article is coated with the powder paint using an electrostatic spray gun (voltage: 50,000 to 90,000 V, air pressure: 2 to 3 kg/cm) before the baking. According to electrostatic fluidization dip coating, an article is dipped in an electrostatic fluidized powder bed before the baking. The thus formed coating of the present invention generally has a thickness of 20 to 250μ.

The present invention will now be described in detail by reference to the following Examples that by no means limit the scope of the invention.

Properties mentioned in the Examples were determined according to the following methods.

(1) Molecular Weight:
Gel permeation chromatography method using, as a standard sample, a polystyrene manufactured by Pressure Chemical Co., U.S.A. and as an apparatus, WATERS 200 manufactured by Japan-Waters Co., Japan.

(2) Softening Point:
According to JIS K 2531.

(3) Melt Viscosity:
Flow tester method using KOKA type flow tester manufactured by Shimazu Seisakusho, Japan.

(4) Gloss (60° Specular gloss):
According to JIS K 5400

(5) Du Pont Impact Strength (Weight 500 g, Diameter ½"):
According to Inspection Standards of Japan Paint Inspection Association (6) Erichsen Test (Extrusion rod diameter: 10 mm):
According to Inspection Standards of Japan Paint Inspection Association (7) Salt Spray Resistance (Width of rust caused after the sample is subjected to 3% salt water spraying and allowed to stand at 35° C. for 500 hours):
According to JIS K 5400

(8) Weatherability (Gloss retention after 300 hours' exposure to weatherometer):
According to JIS K 5400

The bonding between the unsaturated ring moiety and the other moiety in the monofunctional unsaturated alicyclic compounds to be used for introducing the component (B) is made at any of positions as shown by the projections in the following formulae:

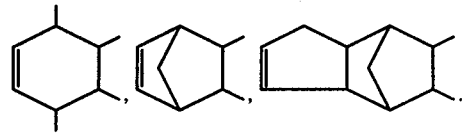

The respective compounds may be prepared by known methods (see, for example, Japanese Patent Application Publication Nos. 37716/1972 and 41108/1972, and Japanese Patent Application Laid-Open Specification No. 93422/1974). These compounds are usually obtained in the form of a mixture of compounds having different positions bonded and they, as such, may be used without separation therebetween. In Examples of the present application, these compounds are used in the form of such a mixture.

Referential Example 1

This Example illustrates preparation of polyesters.

From starting compounds shown in Table 1, polyesters were prepared under the following preparation conditions.

In a 1-liter capacity flask equipped with a distillate-taking out tube, a stirring rod and a nitrogen-introducing tube, ester exchange reaction was carried out between a dimethyl ester of an aromatic dicarboxylic acid and a glycol, in the presence of an ester exchange reaction catalyst (calcium acetate), at 190° to 230° C., in a nitrogen atmosphere, to synthesize a corresponding hydroxyalkyl ester oligomer of the aromatic dicarboxylic acid. Then, other polycarboxylic acid, a polyhydric alcohol and an unsaturated alicyclic compound were added to the oligomer, and condensation reaction was carried out at 180° to 200° C. while blowing nitrogen into the mixture until the conversion reached 95%. Then, a polycondensation catalyst (antimony trioxide) was added to the reaction mixture and condensation was continued at 180° to 200° C. under a reduced pressure of 0.01 to 5 mm Hg until an intended viscosity was attained. After completion of the reaction, the reaction mixture was rapidly cooled. Properties of the so obtained polyesters are shown in Table 1. Incidentally, polyester No. 10 in Table 1 was prepared only by condensation reaction.

Table 1

| Polyester No. | Starting Compounds, g | Softening Point, °C. | Molecular Weight |
|---|---|---|---|
| 1 | DMT(380), FA(70), EG(260), TMP(10), NBA(35) | 64 | 6000 |
| 2 | DMT(390), FA(46), EG(270), NPG(42), DPC(70) | 105 | 9000 |
| 3 | DMT(380), FA(162), HA(23), EG(310), DPP(125) | 44 | 8500 |
| 4 | DMT(390), FA(116), EG(310), PG(15), DPE(125) | 60 | 5000 |
| 5 | DMT(80), IPA(266), FA(110), EG(223), PG(60), DPE(110) | 47 | 6500 |
| 6 | DMI(400), SA(71), AA(30), EG(124), PG(180), DPE(110) | 50 | 5500 |
| 7 | DMT(110), DMI(300), EG(250), HD(60), DPE(80) | 61 | 7000 |
| 8 | DMT(390), FA(120), HA(35), EG(120), PG(125) | 69 | 7500 |
| 9 | DMT(400), FA(130), EG(140), PG(130) | 65 | 7500 |
| 10 | FA(200), EG(110), PG(130), DPE(110) | 21 | 7000 |

Notes:
DMT: dimethyl terephthalate
DMI: dimethyl isophthalate
FA: fumaric acid
EG: ethylene glycol
TMP: trimethylol propane
NPG: neopentyl glycol
IPA: isophthalic acid
PG: propylene glycol
SA: succinic acid
AA: adipic acid
HD: 1,6-hexanediol
HA: endomethylenetetrahydrophthalic anhydride NBA: [norbornane–CH₂OH structure]

DPC: [dicyclopentadiene–OCH₂CH₂O–phenyl–COOH structure]

DPP: [dicyclopentadiene–OCH₂CHOH–CH₃ structure]
(propylene glycol-added dicyclopentadiene)

DPE: [dicyclopentadiene–OCH₂CH₂OH structure]
(ethylene glycol-added dicyclopentadiene)

EXAMPLE 1

Each of polyesters Nos. 1 to 7 prepared in Referential Example 1 was kneaded with a flow modifier (Modaflow manufactured by Monsanto Co., U.S.A.) and titanium oxide at 140° C. for 10 minutes by means of a kneader, and the composition was pulverized and passed through a 150-mesh sieve. Particles which had passed through the sieve were recovered to obtain a powder paint. Each of the so obtained powder paints was electrostatically spray coated on a metal panel and baked at 210° C. for 15 minutes. The obtained results are shown in Table 2 (Runs. Nos. 1 to 9).

COMPARATIVE EXAMPLE 1

Using polyesters Nos. 4 and 8 to 10 prepared in Referential Example 1, powder paints were prepared in the same manner as described in Example 1, and they were coated and baked to obtain results shown in Table 2 (Runs Nos. 10 to 17.

As apparent from the results shown in Table 2, the coating compositions of the present invention are prominently excellent over the comparative coating compositions with respect to the adaptability to either thick coating or thin coating. More specifically, when thick coatings are formed using the coating compositions of the present invention, they are excellent in appearance and physical properties (Du Pont impact strength and Erichsen value). Further, when a pigment is incorporated at a high concentration in the coating compositions of the present invention and thin coatings are formed therefrom, the coatings are excellent in appearance and physical properties.

Table 2

| Run No. | 1 | 2 | 3 | 4 | 5 | 6 | 7 | 8 | 9 |
|---|---|---|---|---|---|---|---|---|---|
| Composition of Powder Paint | | | | | | | | | |
| Polyester No. | 1 | 2 | 3 | 4 | 4 | 5 | 6 | 6 | 7 |
| Amount, parts by weight | 100 | 100 | 100 | 100 | 100 | 100 | 100 | 100 | 100 |
| Amount of Modaflow, parts by weight | 0.5 | 0.5 | 0.5 | 0.5 | 0.5 | 0.5 | 0.2 | 0.5 | 0.2 |
| Amount of Titanium Oxide, parts by weight | 80 | 30 | 80 | 40 | 90 | 65 | 40 | 90 | 40 |
| Properties of Coating | | | | | | | | | |
| Thickness, μ | 40 | 120 | 35 | 130 | 30 | 40 | 120 | 40 | 120 |
| Appearance Shrink[a] | 4 | 5 | 5 | 5 | 5 | 5 | 4 | 4 | 4 |
| Orange peel[b] | 4 | 4 | 5 | 5 | 5 | 5 | 5 | 5 | 4 |
| Gloss (60°), % | 85 | 90 | 95 | 98 | 97 | 84 | 80 | 82 | 84 |
| Du Pont Impact Strength (½″ × 500 g), cm | 30 | 40 | 55 | 55 | 60 | 45 | 30 | 35 | 30 |
| Erichsen Value, mm | 7.3 | 7.5 | 8.3 | 8.5 | 8.8 | 7.7 | 6.4 | 7.1 | 6.6 |
| Blocking Resistance[c] of Powder Paint | 5 | 5 | 5 | 5 | 5 | 4 | 4 | 4 | 5 |

| Run No. | 10 | 11 | 12 | 13 | 14 | 15[d] | 16[e] | 17 |
|---|---|---|---|---|---|---|---|---|
| Composition of Powder Paint | | | | | | | | |
| Polyester No. | 8 | 8 | 4,8 | 4,9 | 4,9 | 4 | 8 | 10 |
| Amount, parts by weight | 100 | 100 | 50,50 | 50,50 | 50,50 | 100 | 100 | 100 |
| Amount of Modaflow, parts by weight | 0.2 | 0.5 | 0.5 | 0.2 | 0.5 | 0.5 | 0.5 | 0.5 |
| Amount of Titanium Oxide, parts by weight | 40 | 90 | 40 | 40 | 90 | 90 | 40 | 40 |
| Properties of Coating | | | | | | | | |
| Thickness, μ | 120 | 40 | 120 | 120 | 40 | 30 | 120 | 120 |
| Appearance Shrink[a] | 1 | 4 | 2 | 2 | 3 | 4[f] | 4[g] | 4 |
| Orange peel[b] | 3 | 2 | 3 | 3 | 2 | 1 | 1 | 4 |
| Gloss (60°), % | 64 | 61 | 73 | 70 | 64 | 42 | 40 | 80 |
| Du Pont Impact Strength (½″ × 500 g), cm | 5 | 20 | 20 | 20 | 25 | 55 | 35 | 35 |
| Erichsen Value, mm | 1.5 | 4.7 | 4.1 | 1.8 | 3.7 | 7.9 | 5.6 | 6.2 |
| Blocking Resistance[c] of Powder Paint | 4 | 4 | 4 | 5 | 4 | 4 | 3 | 1 |

REFERENTIAL EXAMPLE 2

Polyesters were prepared in the same manner as described in Referential Example 1 using starting compounds indicated in Table 3. Properties of the so prepared polyesters are also shown in Table 3.

Table 3

| Polyester No. | 11 | 12 | 13 | 14 | 15 | 16 | 17 | 18 | 19 |
|---|---|---|---|---|---|---|---|---|---|
| Starting Compounds, g | | | | | | | | | |
| DMT | 400 | 400 | 350 | 400 | | 390 | 40 | | 400 |
| DMI | | | 50 | | 400 | | | 400 | |
| TMAn | | | | | | 10 | 20 | | |
| SA | | | | | 12 | | | | |
| AA | | 10 | | | | 30 | | | |
| FA | 140 | 90 | 90 | 115 | | 12 | 120 | | 120 |
| MA | | 25 | 25 | | 160 | | | 45 | 120 |
| EG | 120 | | 248 | 200 | 80 | | | | 240 |
| PG | 150 | 300 | 30 | 40 | 180 | 300 | 100 | 300 | |
| NBA | 30 | | | | | | | | |
| DPE | | | 50 | 20 | 20 | 200 | 350 | 17 | 6 |
| DPH | | 50 | | | | | | | |
| Molecular Weight | 7000 | 5000 | 6000 | 8000 | 11000 | 1500 | 1300 | 11000 | 16000 |
| $T_2 - T_1$, °C (A)/(B) | 85 | 74 | 57 | 60 | 63 | 82 | 67 | 23 | 134 |
| Molar Ratio (C)/(B) | 12 | 9 | 12 | 31 | 22 | 0.8 | 24 | 98 | |

Table 3-continued

| Polyester No. | 11 | 12 | 13 | 14 | 15 | 16 | 17 | 18 | 19 |
|---|---|---|---|---|---|---|---|---|---|
| Molar Ratio | 7 | 4 | 6 | 16 | 22 | 0.3 | 2.0 | 5 | 95 |

Note:
TMAn: trimellitic anhydride
MA: maleic acid

DPH: 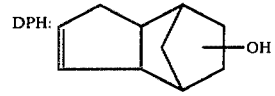

EXAMPLE 2

100 Parts by weight each of the polyesters of the present invention (polyesters Nos. 11, 12 and 14 to 19) prepared in Referential Example 2 were separately kneaded, using a kneader, with 0.3 part by weight of a flow modifier (Modaflow manufactured by Monsanto Co., U.S.A.) and 30 parts by weight of titanium oxide at 120° to 160° C. for 10 minutes, and the resulting compositions were pulverized and sieved by a 150-mesh sieve. Particles that passed through the sieve were collected to obtain powder paints. Each powder paint was coated according to the fluidization dip coating method, on an iron cylinder (80 mm in outer diameter, 70 mm in inner diameter and 200 mm in length) preheated at 200° C. and baked at 200° C. for 25 minutes (Runs Nos. 18 to 24). The obtained results are shown in Table 4.

Table 4

| Run No. | Polyester No. | Thickness, μ outer face(a) | Thickness, μ inner face (b) | (a)/(b) Ratio |
|---|---|---|---|---|
| 18 | 11 | 210 | 180 | 1.17 |
| 19 | 12 | 180 | 165 | 1.09 |
| 20 | 14 | 200 | 200 | 1.00 |
| 21 | 16 | 160 | 120 | 1.33 |
| 22 | 17 | 150 | 115 | 1.30 |
| 23 | 18 | 190 | 150 | 1.27 |
| 24 | 19 | 210 | 160 | 1.31 |

Note:
The thickness of the coating was measured at a point 100 mm apart from the end of the cylinder.

As apparent from the results shown in Table 4, in Runs Nos. 18 to 20, the difference in thickness between the coatings on the outer and inner faces of the cylinder is much smaller than in Runs Nos. 21 to 24. This suggests that the powder paints of Runs Nos. 18 to 20 are suitable for coating articles having a complicated shape or configuration.

EXAMPLE 3

100 Parts each of the polyesters of the present invention (polyesters Nos. 13 to 15, 18 and 19) prepared in Referential Example 2 were kneaded, using a kneader, with 0.5 part by weight of Modaflow, 1 part by weight of carbon black and 10 parts by weight of barium sulfate at 120° to 160° C. for 10 minutes. The compositions were pulverized and sieved using a 150-mesh sieve. Particles that passed through the sieve were collected to obtain powder paints. Each powder paint was coated by electrostatic-fluidization dip on an iron panel and baked at 200° C. for 25 minutes (Runs Nos. 25 to 29). The obtained results are shown in Table 5.

As apparent from the results shown in Table 5, black paints used in Runs Nos. 25 to 27 are excellent over those used in Runs Nos. 28 and 29 with respect to the surface characteristics of the coating, especially reflection sharpners. It is suggested that the polyesters of the former black paints are superior in carbon black-dispersing property to the polyesters of the latter black paints.

Table 5

| Run No. | 25 | 26 | 27 | 28 | 29 |
|---|---|---|---|---|---|
| Polyester No. | 13 | 14 | 15 | 18 | 19 |
| Properties of Coating | | | | | |
| Thickness, μ | 150 | 170 | 150 | 150 | 160 |
| Smoothness | good | excellent | good | fairly good | fairly good |
| Gloss (60°), % | 90 | 98 | 83 | 61 | 70 |
| Reflection Sharpness, cm | 28.7 | 35.0 | 25.2 | 16.0 | 15.4 |

Note:
The reflection sharpness was evaluated according to the following method.

A card board having a width of 5 cm and a length of 50 cm, on which a striped pattern of alternately arranged black and white stripes of a width of 2 mm was formed, was placed horizontally, and a coated panel was erected on one end of the card board rectangularly thereto. Eyes were fixed at a position 40 cm distant horizontally from the coated panel along the card board and 30 cm distant vertically upwardly from the surface of the card board. From this point the black-white pattern reflected on the panel was seen and the highest point where the black-white pattern reflected on the panel could be definitely discriminated was determined and the distance from the panel-erected end to the above critical point was measured.

EXAMPLE 4

In a 1-liter capacity flask equipped with a distillate-taking out tube, a stirring rod and a nitrogen-introducing tube, ester exchange reaction was carried out between 388 g of dimethyl terephthalate and 273 g of ethylene glycol, in the presence of an ester exchange reaction catalyst (0.2 g of calcium acetate), at 190° to 230° C., in a nitrogen atmosphere, to synthesize on oligomer of bishydroxyethyl terephthalate. Then, 20 g of succinic acid, 93 g of fumaric acid and 78 g of ethylene glycol-added dicyclopentadiene were added to the oligomer, and condensation reaction was carried out at 180° to 210° C. for 6 hours while blowing nitrogen gas into the flask. Then, a polycondensation catalyst (0.4 g of antimony trioxide) was added to the reaction mixture, and condensation reaction was further carried out at 180° to 210° C. for 5 hours under a reduced pressure of 0.01 to 5 mm Hg to obtain a polyester resin (polyester No. 20) having a softening point of 60° C. and a molecular weight of 5000.

The so obtained polyester resin (polyester No. 20) was kneaded with a flow modifier (Modaflow manufactured by Monsanto Co., U.S.A.), titanium oxide and anhydrous ferric chloride at 140° C. for 10 minutes using a kneader. The composition was pulverized and then sieved by a 150-mesh sieve. The particles that passed through the sieve were collected to obtain a powder paint. The powder paint was electrostatically spray-coated on a metal panel and baked at 190° C. for 25 minutes to form a coating having a thickness of 75 to 80μ. The obtained results are shown in Table 6.

Table 6

| Run No. | 30 | 31 | 32 | 33 |
|---|---|---|---|---|
| Amounts of Ingredients, parts by weight | | | | |
| Polyester No. 20 | 100 | 100 | 100 | 100 |
| Modaflow | 0.5 | 0.5 | 0.5 | 0.5 |
| Titanium Oxide | 40 | 40 | 40 | 40 |
| Ferric Chloride | 0.001 | 0.01 | 0 | 0.9 |
| Properties of Coating | | | | |
| Gloss, % | 93 | 96 | 98 | 81 |
| Du Pont Impact Strength, cm | 40 | 35 | 30 | 30 |
| Salt Spray Resistance, mm | 1–2 | 1–2 | 5–8 | 2–4 |
| Weatherability, % | 85 | 87 | 84 | 63 |

As apparent from the results shown in Table 6, when an iron compound is incorporated (Runs Nos. 30 and 31), there can be obtained a coating having a higher corrosion resistance (salt spray resistance) than a coating obtained when an iron compound is not added (Run No. 32). It is also apparent that when an iron compound is incorporated in too large an amount (Run No. 33), the weatherability is degraded.

EXAMPLE 5

A polyester resin having a softening point of 57° C. and a molecular weight of 6000 (polyester No. 21) was prepared in the same manner as described in Example 4 using, as the polyester-forming starting compounds, 390 g of dimethyl terephthalate, 20 g of succinic acid, 93 g of fumaric acid, 270 g of ethylene glycol and 85 g of propylene glycol-added dicyclopentadiene.

In the same manner as described in Example 4, a powder paint was prepared using the so prepared polyester resin (polyester No. 21), a flow modifier (Modaflow manufactured by Monsanto Co., U.S.A.), titanium oxide, iron(III) acetylacetonate and methylhydropolysiloxane. The prepared paint was coated on metal panel in the same manner as described in Example 4. The obtained results are shown in Table 7.

Table 7

| Run No. | 34 | 35 | 36 | 37 |
|---|---|---|---|---|
| Amounts of Ingredients, parts by weight | | | | |
| Polyester No. 21 | 100 | 100 | 100 | 100 |
| Modaflow | 0.5 | 0.5 | 0.5 | 0.5 |
| Titanium Oxide | 50 | 50 | 50 | 50 |
| Iron(III) Acetylacetonate | 0.007 | 0.007 | 0.007 | 0.007 |
| Polysiloxane | 0 | 0.02 | 0.085 | 6.5 |
| Properties of Coating | | | | |
| Gloss, % | 89 | 93 | 95 | 81 |
| Du Pont Impact Strength, cm | 40 | 55 | 60 | 30 |
| Salt Spray Resistance, mm | 1–2 | below 1 | below 1 | 2–3 |
| Stain Resistance | good | good | good | fairly good |

Note:
The stain resistance was evaluated by the degree of decontamination of applied magic ink (black) with toluene/methanol.

As apparent from the results shown in Table 7, when polysiloxane is added (Runs Nos. 35 and 36), more preferable results are obtained with respect to gloss, Du Pont impact strength and salt water spray resistance than when polysiloxane is not added (Run No. 34). However, when polysiloxane is added in too large an amount (Run No. 37), the stain resistance is degraded.

EXAMPLE 6

A polyester resin having a softening point of 60° C. and a molecular weight of 7000 (polyester No. 22) was prepared in the same manner as described in Example 4 except that, as polyester-forming starting compounds, 390 g of dimethyl terephthalate, 40 g of dimethyl isophthalate, 100 g of fumaric acid, 280 g of ethylene glycol and 45 g of propylene glycol-added dicyclopentadiene were employed and 50 mg of iron(III) acetylacetonate was added simultaneously with the polycondensation catalyst.

For comparison, polyester resins (polyester Nos. 23 to 25) were prepared in the same manner as described above except that 50 mg of manganese(III) acetylacetonate, cobalt(III) acetylacetonate or nickel(II) acetylacetonate was used instead of the iron(III) acetylacetonate.

A flow modifier (Modaflow manufactured by Monsanto Co., U.S.A.) and titanium oxide were added to the so prepared polyester resins (polyesters Nos. 22 to 25), and powder paints were prepared and coated in the same manner as described in Example 4. The obtained results are shown in Table 8.

Table 8

| Run No. | 38 | 39 | 40 | 41 |
|---|---|---|---|---|
| Amounts of Ingredients, parts by weight | | | | |
| Polyester | 100 (No. 22) | 100 (No. 23) | 100 (No. 24) | 100 (No. 25) |
| Modaflow | 0.7 | 0.7 | 0.7 | 0.7 |
| Titanium Oxide | 60 | 60 | 60 | 60 |
| Baking Conditions [(°C.) × minutes] | 200 × 20 | 200 × 20 | 200 × 20 | 200 × 20 |
| Properties of Coating | | | | |
| Gloss, % | 92 | 85 | 81 | 86 |
| Du Pont Impact Strength, cm | 60 | 30 | 35 | 35 |
| Salt Spray Resistance, mm | below 1 | 4–6 | 5–7 | 5–7 |

Note:
Coating thickness: 75–80 μ

As apparent from the results shown in Table 8, polyester No. 22 including an iron compound (Run No. 38) provides a coating having a higher salt spray resistance than polyesters Nos. 23 to 25 including a manganese, cobalt or nickel compound (Runs Nos. 39 to 41).

EXAMPLE 7

A polyester having a softening point of 53° C. and a molecular weight of 8,500 (polyester No. 26) was prepared in substantially the same manner as described in Example 4 except that, 300 g of dimethyl terephthalate, 80 g of dimethyl isophthalate, 120 g of fumaric acid, 250 g of ethylene glycol and 60 g of triethylene glycol-added dicyclopentadiene were used as polyester-forming starting compounds.

On the other hand, a polyester having a softening point of 53° C. and a molecular weight of 8,500 (polyester No. 27) was prepared in substantially the same manner as in the preparation of polyester No. 26 except that iron(III) nitrate and dimethyl polysiloxane were added, in the course of polycondensation, in such quantities that they might be contained in the produced polyester in amounts of 0.01 part by weight and 0.1 part by weight, respectively, per 100 parts by weight of the produced polyester.

Using these polyesters, coatings were formed in substantially the same manner as in Example 4 except the conditions as specified in Table 9. The results of the coatings are shown in Table 9.

Table 9

| Run No. | 42 | 43 | 44 | 45 |
|---|---|---|---|---|
| Composition of Powder Paint | | | | |
| Polyester No. | 26 | 26 | 26 | 27 |
| Amount, Parts by Weight | 100 | 100 | 100 | 100 |
| Amount of Modaflow Parts by Weight | 0.3 | 0.3 | 0.3 | 0.3 |
| Amount of Titanium Oxide, Parts by Weight | 70 | 70 | 70 | 70 |
| Amount of Iron (III) Nitrate, Parts by Weight | 0.01 | 0.01 | 0.01 | not added |
| Amount of Dimethyl Polysiloxane, Parts by Weight | not added | 0.1 | 0.1 | not added |
| Method of Adding Iron Compound and/or Polysiloxane | (A) | (B) | (C) | — |
| Properties of Coating | | | | |
| Glose (60°), % | 81 | 83 | 95 | 99 |
| Du Pont Impact Strength (½" × 500g), cm | 35 | 35 | 50 | 60 |
| Salt Spray Resistance, mm | 6-8 | 6-8 | 2-3 | below 1 |

Notes:
Method (A): Iron (III) nitrate having a particle size all passable through a 400-mesh sieve was admixed, over 10 hours, with the powder paint in a dry state by means of a ball mill.
Method (B): Dimethyl polysiloxane and iron (III) nitrate having a particle size all passable through a 400-mesh sieve were admixed with the powder paint in substantially the same manner as of Method A.
Method (C): Dimethyl polysiloxane and iron (III) nitrate were added in a molten state when the powder paint composition was molten and kneaded at 120° C. for 10 minutes by a kneader manufactured by Brabender, W. Gremany.
Baking Conditions: At 200° C. for 25 minutes.
Coating Thickness: 40–50 μ.

As apparent from the results shown in Table 9, in case the iron compound and/or the silicone compound was not dissolved in the polyester and dispersed in the powder paint (Runs Nos. 42 and 43), no improvement in the salt spray resistance was observed.

EXAMPLE 8

A polyester having a softening point of 55° C. and a molecular weight of 7500 (polyester No. 28) was prepared in substantially the same manner as in the preparation of polyester No. 27 except that 45 g of

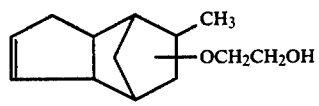

was employed instead of triethylene glycol-added dicyclopentadiene.

Using the polyster No. 28, a powder point was prepared in substantially the same manner as in Run No. 45. The coating formed using the prepared powder paint had a gloss of 93%, Du Pont impact strength of 55 cm and a salt spray resistance of below 1 mm.

EXAMPLE 9

A polyester having a softening point of 57° C. and a molecular weight of 7000 (polyester No. 29) was prepared in substantially the same manner as in the preparation of polyester No. 26 of Example 7 except that, instead of ethylene glycol, 100 parts by weight of ethylene glycol and 0.1 part by weight of iron(II) chloride were employed and they were mixed and heated at 120° C. for 2 hours to obtain ethylene glycol containing iron values, and, instead of triethylene glycol-added dicyclopentadiene, 30 g of

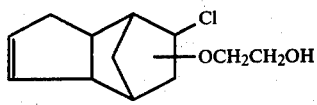 was employed.

Using the polyester No. 29, a powder paint was prepared and used to form a coating in the same manner as in Run No. 45. The coating has a gloss of 90%, Du Pont impact strength of 55 cm and salt spray resistance of below 1 mm.

EXAMPLE 10

A polyester having a softening point of 40° C. and a molecular weight of 9000 (polyester No. 30) was prepared in substantially the same manner as in Example 4 except that 200 g of dimethyl terephthalate and 160 g of an addition reaction product of equimolar amounts of methyl para-hydroxybenzoate and ethylene oxide were employed instead of 388 g of dimethyl terephthalate.

100 parts by weight of the polyester No. 30, 0.2 part by weight of Modaflow and 60 parts by weight of titanium oxide were kneaded using a kneader at 140° C. for 10 minutes. The resulting mixture was then pulverized and sieved by a 150-mesh sieve. The thus obtained powder paint passed through the sieve was applied onto a metal panel by electrostatic coating and baked at 220° C. for 20 minutes. The formed coating had a thickness of 50μ, a shrink of 4, an orange peel of 5, a gloss of 87%, a Du Pont impact strength of 40 cm and an Erichsen value of 7.0 mm.

EXAMPLE 11

A polyester having a softening point of 55° C. and molecular weight of 7000 (polyester No. 31) was obtained in substantially the same manner as in Example 4 except that 45 g of fumaric acid and 35 g of hydroxylated norbornene carboxylic acid were employed instead of 93 g of fumaric acid.

Using the polyester No. 31, a powder paint was prepared and coated on a metal panel in substantially the same manner as in Example 10. The formed coating had a thickness of 60μ, a shrink of 5, an orange peel of 4, a gloss of 90%, a Du Pont impact strength of 45 cm and an Erichsen value of 7.4 mm.

What is claimed is:

1. A polyester type powder coating composition comprising a polyester comprising as main ester-constituting monomer units, (1) at least one polycarboxylic acid component containing at least 10 mole %, based on the polycarboxylic acid component, of at least one aromatic polycarboxylic acid component (A) and (2) at least one polyhydric alcohol component, said polyester having in its main chain at least one terminal blocked with a monofunctional unsaturated alicyclic compound component (B) which is a monohydric alcohol component of a compound represented by the following formula and/or its derivative wherein at least one hydrogen atom of its tricyclodecene ring is substituted with an alkyl group having 1 to 3 carbon atoms or halogen:

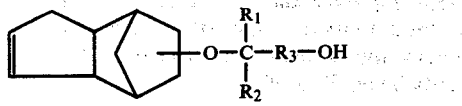

wherein $R_1$ and $R_2$ each stand for a hydrogen atom or an alkyl group having 1 to 3 carbon atoms and $R_3$ stands for a straight-chain or branched alkylene group having 1 to 10 carbon atoms or a divalent residue having at least one member selected from an ether linkage, an ester linkage, an urethane linkage, amide linkage, thioether linkage and sulfone linkage, and a straight-chain or branched alkylene group having 1 to 10 carbon atoms and/or phenylene group, and the total of the carbon atoms of $R_1$, $R_2$ and $R_3$ is 0 to 19, and said polyester having a softening point of 30° to 150° C.

2. A polyester type powder coating composition as set forth in claim 1, wherein said polycarboxylic acid component further contains at least one $\alpha,\beta$-unsaturated dicarboxylic acid component (C), the (A)/(B) and (C)/(B) molar ratios in the monomer units of said polyester are from 1 to 85 and from 0.5 to 70, respectively, and the difference $(T_2-T_1)$ between the softening point $(T_1, °C.)$ of said polyester and the temperature, $T_2$, °C.) at which said polyester has a melt viscosity of 2000 poises is 30° to 120° C.

3. A polyester type powder coating composition as set forth in claim 2, wherein said aromatic polycarboxylic acid component (A) is a terephthalic acid component and said $\alpha,\beta$-unsaturated dicarboxylic acid component (C) is a fumaric acid component.

4. A polyester type powder coating composition as set forth in any of claims 1 to 3, wherein there is absent a hardener and/or a hardening catalyst.

5. A polyester type powder coating composition as set forth in any of claims 1 to 3, wherein said monofunctional unsaturated alicyclic compound component (B) is a monohydric alcohol component represented by the following formula and/or its derivative wherein the hydrogen atom of its tricyclodecene ring is substituted with an alkyl group having 1 to 3 carbon atoms or halogen:

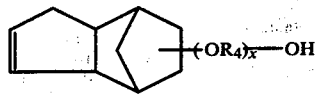

wherein $R_4$ stands for a straight-chain or branched alkylene group having 2 to 10 carbon atoms, x stands for an integer of from 1 to 5, and the total of the carbon atoms contained in $-OR_4-_x$ is 2 to 20.

6. A polyester type powder coating composition as set forth in any of claims 1 to 3, which further comprises iron values substantially dissolved in the polyester and said iron values are incorporated in an amount of 0.00001 to 0.1 part by weight, as calculated as the iron atom, per 100 parts by weight of the polyester.

7. A polyester type powder coating composition as set forth in claim 6, wherein in addition to the iron values, a silicon compound is incorporated in an amount of 0.0001 to 1 part by weight, as calculated as the silicon atom, per 100 parts by weight of the polyester.

8. A polyester type powder coating composition as set forth in any of claims 1 to 3, wherein said main monomer units are present in an amount of 60 to 100 mole % based on the total ester-constituting monomer units of the polyester.

9. A polyester type powder coating composition as set forth in any of claims 1 to 3, wherein said polyester has a number average molecular weight of 500 to 20,000.

* * * * *

UNITED STATES PATENT AND TRADEMARK OFFICE
CERTIFICATE OF CORRECTION

PATENT NO. : 4,180,652
DATED : December 25, 1979
INVENTOR(S) : SUMITAKA NOGAMI ET AL It is certified that error appears in the above-identified patent and that said Letters Patent are hereby corrected as shown below:

Col. 10, line 42, delete "-$CH_2$-".

Col. 27, line 24 (claim 1, second line from the bottom), Delete "0 to 19" and insert therefor --1 to 19--.

Signed and Sealed this

Seventeenth Day of June 1980

[SEAL]

Attest:

SIDNEY A. DIAMOND

Attesting Officer

Commissioner of Patents and Trademarks